March 29, 1960 F. GINDROZ, JR 2,930,963
CONSTANT FREQUENCY ALTERNATOR
Filed March 25, 1959 2 Sheets-Sheet 1

INVENTOR
FRANK GINDROZ, JR.

BY Scrivener & Parker
ATTORNEYS

March 29, 1960     F. GINDROZ, JR     2,930,963
CONSTANT FREQUENCY ALTERNATOR
Filed March 25, 1959     2 Sheets-Sheet 2
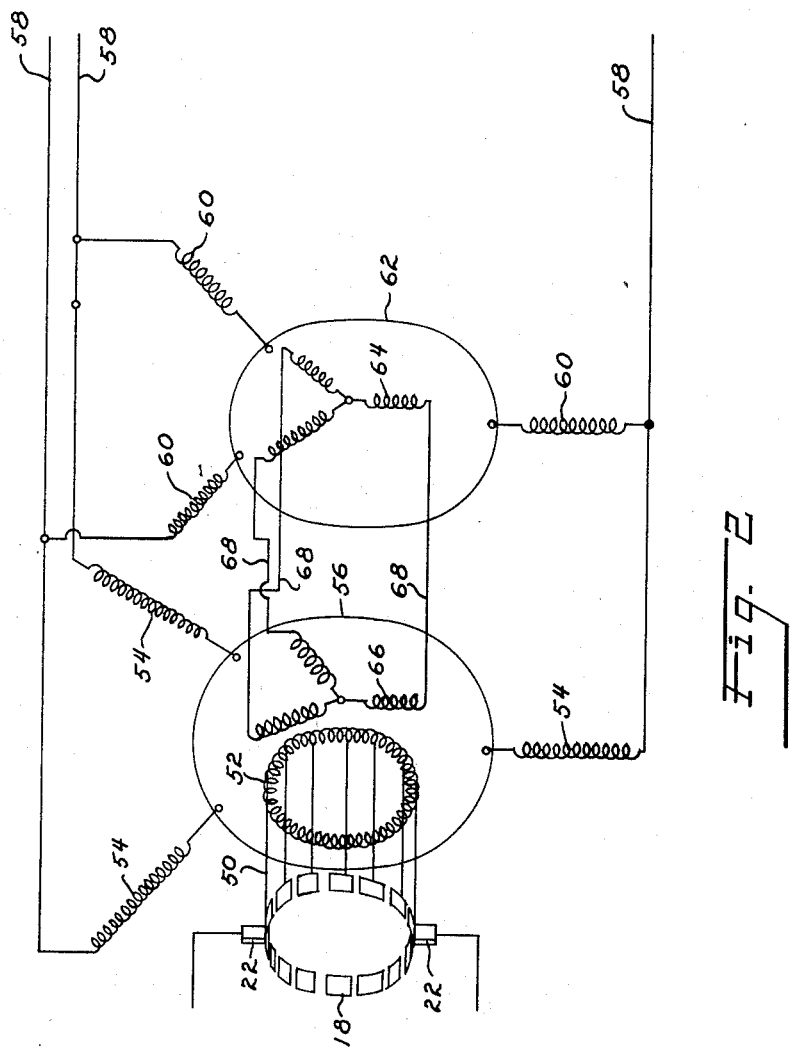
INVENTOR
FRANK GINDROZ, JR.
BY *Scrivener & Parker*
ATTORNEYS

United States Patent Office 2,930,963
Patented Mar. 29, 1960

2,930,963

CONSTANT FREQUENCY ALTERNATOR

Frank Gindroz, Jr., Torrance, Calif., assignor to Electrical Engineering & Manufacturing Corporation, Los Angeles, Calif., a corporation of California Application March 25, 1959, Serial No. 801,814

8 Claims. (Cl. 322—56)

This invention relates to alternating current generators and more particularly to the constant output frequency-variable speed type.

In the prior art, alternating current generators, hereinafter referred to as alternators, have been devised in which the rotor speed is allowed to vary and suitable means are provided by which the speed of rotation of the magnetic field in the rotor is maintained constant. If the power necessary to maintain the magnetic field in the stator is brought in through a brush and commutator arrangement, there is, of necessity, a large amount of power transfer through the brushes. This is highly undesirable in that improper commutation, arcing and dielectric breakdown are often encountered.

The desired result, however, without the above described difficulties, is that the magnetic poles are set up in the rotor strictly as a function of brush speed and not as a function of rotor speed. Consequently, the number of magnetic poles in the stator is equal to the number of brushes and these poles will move with the speed of the brushes alone regardless of whether the rotor is rotating or not. Since the magnetic poles in the rotor will move with the brushes, a corresponding alternating current of one fixed frequency will be induced in the stator windings of the alternator as the flux from the moving poles cuts the stator windings. If the proper speed of the brush holder is selected to correspond with the number of brushes and hence the like number of magnetic poles, the desired frequency can be obtained and maintained to a fine degree of accuracy.

If a conventional D.C. exciter is utilized to supply power to the brushes and subsequently to the rotor, and the condition is encountered in which the speed of the rotor falls to zero, then all of the power necessary to rotate the magnetic field in the rotor must come from the D.C. exciter. In fact, if the power curve is followed from synchronous rotor speed down to zero, it can be shown that the D.C. exciter must supply the magnetizing force necessary to maintain the magnetic field and, in addition, the power necessary to control the speed of rotation of the magnetic poles in the rotor regardless of actual rotor speed.

As a result, large amounts of power must at times be transferred through the brushes, which as described above is highly undesirable.

It is, therefore, a primary object of this invention to eliminate the need for large power transfer through the brushes of a variable speed-constant frequency alternator.

Another object of this invention is to provide means by which the power necessary to rotate the magnetic field in the rotor is generated internally of the alternator and is not transferred through the brushes.

Still another object of this invention is to provide a variable speed-constant frequency alternator which is trouble-free in operation and particularly adapted for use in aircraft at high altitudes.

These and other objects and advantages of this invention will become apparent from the following specification and drawings which, for the purposes of example, relate to a preferred embodiment of this invention.

In the drawings:

Fig. 2 shows a preferred embodiment of the invention.

Figure 1:
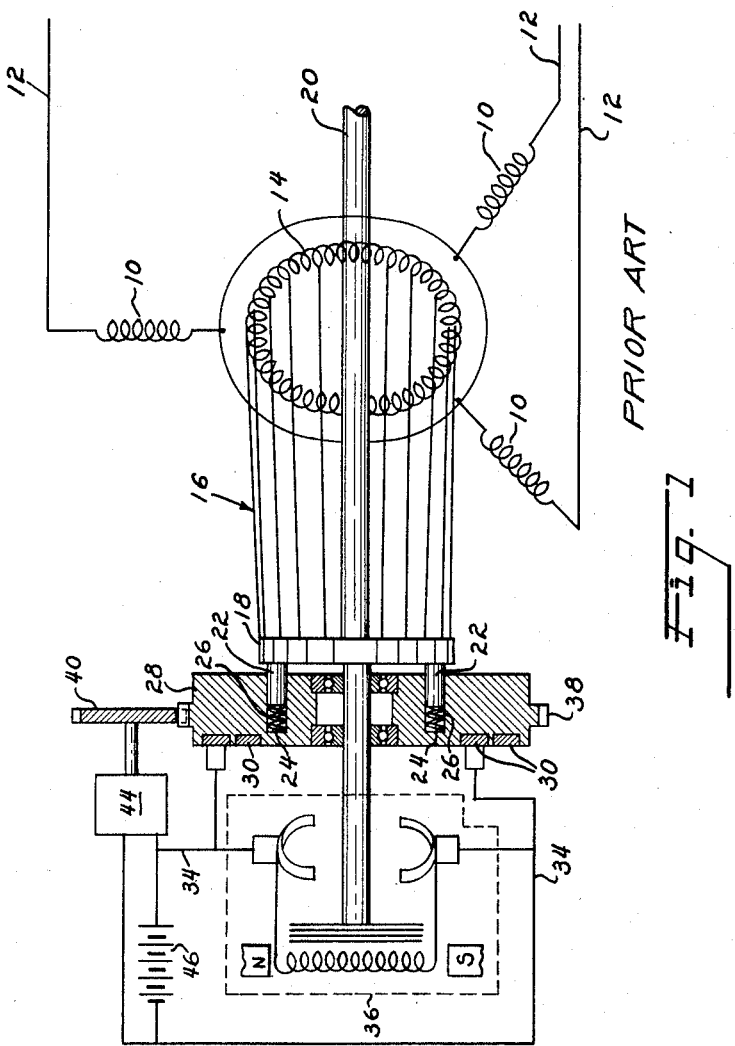
Fig. 1 shows a variable speed-constant frequency alternator of the above-described prior art type.

Referring in detail to the drawings, and more particularly to Fig. 1, the stator windings 10 of the alternator are shown as being connected in a three phase Y relationship with a plurality of power output leads 12 associated therewith. As is readily understood, a delta type three phase winding could also be used.

The rotor winding 14 is illustrated as a lap type winding which is commonly used in the rotors of D.C. machines. An alternate type of winding could be of the conventional wave type or a combination of the wave and lap types.

The rotor winding 14 is sectionally connected through a plurality of input leads 16, as shown, to a commutator 18 in the same manner as is conventional in D.C. motors. Both the rotor (not shown) and the commutator 18 are mounted on a prime mover shaft 20 for direct rotation therewith.

Power is transferred to the rotor windings 14 through the input leads 16 and the commutator 18 by means of a plurality of brushes 22 in contact with the commutator 18. The brushes 22 are shown as being mounted on springs 24 in a plurality of slots 26 in the face of a rotating brush holder 28.

On the opposite face of the rotating brush holder 28 are a pair of slip rings 30 in contact with a corresponding pair of brushes 32 which are connected by leads 34 to the output terminals of a conventional D.C. exciter 36 as shown enclosed in dotted lines.

The rotating brush holder 28 is shown in cross-section as a cylindrical disk or the like having a ring gear 38 on the outer circumference thereof. The rotation of the brush holder is effected by means of a driving pinion 40 mounted on the output shaft 42 of a governor-controlled constant speed D.C. motor 44. The D.C. motor 44 is connected across a suitable power source generally shown at 46 in the D.C. exciter circuit.

The prior art type of stator and rotor windings have been shown on the right hand side of Fig. 1. In Fig. 2, to be hereinafter described, the novel improvement over the conventional winding is shown in combination with the above-described commutator 18 of Fig. 1. The rotating brush holder 28 and associated D.C. motor 44 and D.C. exciter 36 maintain their same interconnection with respect to the commutator 18 of Fig. 2 although they are not shown therein.

Following the description of Fig. 2 and under the heading of "Operation," the novel distinctions of the invention as shown in Fig. 2 will be further clarified over the conventional showing of Fig. 1.

Referring to Fig. 2, the commutator 18 and associated rotating brushes 22 are shown in the relationship described in Fig. 1. The commutator 18 is mounted on a prime mover shaft (not shown) which is also common to the rotor structures (not shown) on which the rotor windings, to be hereinafter described, are mounted.

D.C. power is fed from the rotating brushes 22 and the commutator 18 through input leads 50 to a first or main rotor winding 52. The poles of the magnetic field set up in the first rotor winding 52 will be equal to the number of rotating brushes and so arranged that each pole induced will be positioned halfway between each pair of adjacent brushes. This relationship is maintained regardless of rotor speed.

By comparison to the conventional rotor of a D.C. generator, it is important to point out at this time that no power or current flows are induced in the rotor itself by rotation of the induced magnetic field in relation to the rotor windings.

Neglecting field distortion, the theoretical position of the brushes for maximum power output is coincident with the position of the poles. In this invention, the poles are located halfway between pairs of adjacent brushes and, as a result, the brushes are positioned between the poles. As is well known in the art, if the brushes of a regular D.C. generator are shifted to a position between the poles, the power output is zero because the voltages induced in the rotor windings between the brushes are equal and opposite and nullify each other. It can therefore be seen that the only power produced in the rotor itself, which is added or subtracted to the power coming in through the brushes, is the result of field distortion caused by armature reaction of the stator. Since the strength of the armature reaction has a direct relationship to the power factor in the A.C. output of the stator, this armature reaction and the power regenerated in the rotor are of necessity always small.

Associated with the first or main rotor winding 52 is a first or main stator winding 54 which is shown as a three phase Y connected type. A common connector 56 is used as the neutral point in the Y connection. A.C. output leads 58 extend from the main stator winding 54 to the output terminals of the alternator. Connected across the output leads 58 is a second or supplemental stator winding 60 which is also shown as a three phase Y connected type having a neutral connection 62.

A second or supplemental rotor winding 64 is mounted for rotation on the same prime mover shaft (not shown) as the first or main rotor winding 52. The supplemental rotor winding 64 is associated directly with the supplemental stator winding 60 and is also of the three phase Y connected type. As a result, the supplemental rotor winding 64 is rotated in the same direction as the apparent magnetic field rotation in the supplemental stator winding 60.

A third or compensating three phase Y connected rotor winding 66 is directly connected by leads 68 to the supplemental rotor winding 64 and is wound on the same rotor laminations as the main rotor winding 52. The compensating rotor winding 66 is wound with the same number of poles as the main rotor winding 52 with the poles so arranged as to have an opposite apparent magnetic field rotation from both the main rotor winding 52 and the supplemental rotor winding 64.

*Operation*

Referring to Fig. 1, the operation of the prior art type device and the problems related thereto are as follows:

When D.C. current is introduced into the commutator 18 through the brushes 22 from the D.C. exciter 36, magnetic poles are set up in the rotor winding 14 equal in number to the brushes 22 and rotating at the speed of the brushes 22 in accordance with the speed of rotation of the rotating brush holder 28.

Since the rotating brush holder 28 is driven at a constant synchronous speed by the governor controlled D.C. motor 44, the constant rotational frequency of the magnetic field in the rotor winding 14 induces a constant frequency alternating current in the stator windings 10 as the flux from the field cuts the stator windings.

The frequency of the alternating current induced in the stator windings 10 is not affected by the speed of rotation of the rotor windings 14 in that the speed of rotation of the magnetic poles set up by the brushes 22, and hence the resulting magnetic field, remains constant.

The resulting constant speed of the rotating magnetic field relative to the stator may be further explained by the fact that the brushes 22 are driven at a constant synchronous speed while the commutator 18 with which the brushes cooperate is driven at the speed of the rotor winding 14.

Thus, any variation in rotor speed away from synchronous speed produces a relative speed of rotation between the brushes 22 and the rotor winding 14 and commutator 18. Thus, the resulting magnetic field induced in the rotor winding by the input from the brushes 22 will have a relative speed with respect to the rotor which will either add to or subtract from the actual rotor speed to maintain a rotating field having a constant speed relative to the stator winding 10.

The primary disadvantage in this operation arises from the fact that when the rotor speed varies from synchronous value, the power necessary to rotate the magnetic field in the rotor must all be supplied by the D.C. exciter in addition to the normal magnetizing current. This power must be brought in through the brushes 22 and the commutator 18 and is proportional to the difference between the speed of the rotor and the desired synchronous speed.

For example, in aircraft applications where speed changes of plus or minus 20% are common, a 60 k.v.a. alternator would require values of power transfer through the brushes as high as 15 k.v.a. plus the normal power required for excitation currents. This large amount of power transfer is extremely dangerous at high altitudes where breakdowns are easily induced.

Referring to Fig. 2, the operation of an alternator incorporating the present invention is as follows:

Direct current power is brought in through the brushes 22, the commutator 18 and the input leads 50 to the main rotor winding 52 whereby magnetic poles are set up equal in number to the brushes 22 and located halfway between pairs of adjacent brushes. As described above, the brushes are rotated at a desired synchronous speed by the rotating brush holder 28 (shown in Fig. 1) and the magnetic poles rotate with the brushes 22 whereby a rotating magnetic field is set up in the main rotor winding 52 with a speed of rotation relative to the main stator winding 54 equal to the desired synchronous speed of the brushes.

The rotating magnetic field in the main rotor winding 52 induces alternating current at synchronous frequency in the main stator winding 54. The power output of the main stator winding is fed to the output leads 58 of the alternator and at the same time to the supplemental stator winding 60 which is connected across the output leads 58.

The power in the supplemental stator winding 60 induces a rotating magnetic field therein. The supplemental rotor winding 64, which is mounted on the same prime mover shaft as the main rotor winding 52, is rotated in the same direction as the apparent direction of rotation of the rotating magnetic field in the supplemental stator winding 60.

Hence, a voltage is induced in the supplemental rotor winding 64 at a frequency which is proportional to the difference between the apparent speed of rotation of the magnetic field in the supplemental stator winding and the actual speed of rotation of the prime mover shaft on which the supplemental rotor winding 64 is mounted.

The compensating rotor winding 66, being connected to the supplemental rotor winding 64 and mounted on the same rotor structure as the main rotor winding 52, as described above, has the same number of magnetic poles as the main rotor winding 52 but is wound for a reverse magnetic field or phase rotation with respect to the magnetic field in the main rotor winding 52 and the speed of rotation of the magnetic field therein will be equal to that of the main rotor winding.

In explanation of this latter condition, consider the case in which the actual rotor speed is one thousand r.p.m. above synchronous speed. Thus, a voltage of a frequency corresponding to a standard generator having the same number of poles as the main rotor winding and rotating at one thousand r.p.m. is generated in the supplemental rotor winding 64. If this voltage is now impressed on the compensating rotor winding 66 in reversed phase rotation, a magnetic field is induced therein which has an apparent rotation of one thousand r.p.m. in reverse to the actual rotor rotation. This subtracts one thousand r.p.m. from the actual rotor speed, thereby maintaining a magnetic field rotation of exactly synchronous speed which acts to reinforce the magnetic field in the main rotor winding 52. With the magnetic field reinforced in this matter, it is now possible to take large amounts of power out of the output leads 58 without increasing the power transferred through the brushes 22 and commutator 18.

In addition, when the actual rotor speed is at any time greater than synchronous speed, additional power is necessary to rotate the main alternator magnetizing field in the main rotor winding 52 relative to the actual speed of the rotor. This additional power is directly proportional to the speed difference. This invention also compensates for this difficulty in that the supplemental stator and rotor windings 60 and 64, respectively, cause the power delivered to the supplemental stator winding 60 by the main stator winding 54 to be increased by an amount proportional to the speed difference above synchronous. Thus, the additional power necessary to maintain the rotating magnetic field in the main rotor winding 52 is automatically compensated for by this invention.

As can be seen from the above description and the related drawings, this invention provides a novel constant frequency-variable speed alternator capable of a wide range of use with complete internal generation of the power necessary to maintain stable operation.

It is to be understood that the embodiment of this invention shown in the drawings and described in the above specification is for the purpose of example only and is not intended to limit the scope of the appended claims.

I claim:

1. In a constant frequency alternator having a variable speed rotor, in combination, a main rotor winding, a main stator winding associated with said main rotor winding, means for inducing a rotating magnetic field in said main rotor winding having a predetermined synchronous speed of rotation, supplemental stator windings connected across the output terminals of said main stator winding, supplemental rotor windings associated with said supplemental stator windings and mounted for rotation in the same direction as said main rotor winding, and compensating rotor windings electrically connected with said supplemental rotor windings such that a voltage induced in said supplemental rotor windings will be impressed on said compensating windings and induce a magnetic field therein having a direction of rotation opposite to the direction of rotation of said supplemental rotor windings.

2. In a constant frequency alternator having a variable speed rotor, in combination, a main rotor winding, a main stator winding associated with said main rotor winding, means for inducing a rotating magnetic field in said main rotor winding having a predetermined synchronous speed of rotation in the same direction of rotation as said main rotor winding, supplemental stator windings connected across the output terminals of said main stator winding, supplemental rotor windings associated with said supplemental stator winding and mounted for rotation in the same direction as said main rotor winding, and compensating windings wound on the same rotor laminations with said main rotor winding and electrically interconnected with said supplemental rotor windings such that a voltage induced in said supplemental rotor windings will be impressed on said compensating rotor windings and induce a magnetic field therein having a direction of rotation opposite to the direction of rotation of said supplemental rotor windings.

3. In a constant frequency alternator having a variable speed rotor, in combination, a main rotor winding, a main stator winding associated with said main rotor winding, means for inducing a first rotating magnetic field in said main rotor winding having a predetermined synchronous speed of rotation, second means responsive to the alternating voltage induced in said main stator winding by said rotating magnetic field in said main rotor winding to produce a second rotating magnetic field in synchronism with said voltage; a variable speed rotor shaft, third means mounted on said rotor shaft for rotation therewith and responsive to said second rotating magnetic field for producing an alternating voltage as a function of the difference between the speed of said second rotating magnetic field and said variable speed rotor shaft and third means actuated by said alternating voltage in said second means for inducing a third rotating magnetic field in an opposite rotational sense to said second rotating magnetic field in additive relationship to said first rotating magnetic field in said main rotor winding whereby the power necessary to maintain the strength of said first rotating field in response to a change in speed of said variable speed rotor shaft is effected.

4. In a constant frequency alternator having a variable speed rotor, in combination, a main rotor winding mounted on said variable speed rotor and having a constant frequency rotating magnetic field therein, a main stator winding associated wtih said main rotor winding and having a voltage induced therein by said rotating magnetic field, sensing means for producing an alternating voltage as a function of the difference in speed between said variable speed rotor and said constant frequency rotating magnetic field, and compensating means responsive to the voltage induced in said sensing means to produce a second rotating magnetic field acting to reinforce said constant frequency field.

5. The device as described in claim 4 wherein said sensing means comprises supplemental stator windings connected across the output terminals of said main stator winding and a supplemental rotor winding mounted for rotation with said variable speed rotor.

6. The device as described in claim 4 wherein said compensating means comprises a rotor winding wound for reverse phase rotation with respect to said main rotor winding.

7. The device as described in claim 6 wherein said rotor winding is wound on said variable speed rotor on the same laminations as said main rotor winding.

8. The device as described in claim 6 wherein said rotor winding contains the same number of magnetic poles as said main rotor winding.

No references cited.